July 30, 1940.     E. ROSS     2,209,582
OPTICAL FILM PRINTING
Filed May 26, 1936     3 Sheets-Sheet 1

INVENTOR
ERNEST ROSS
BY
ATTORNEY

July 30, 1940.                E. ROSS                2,209,582
OPTICAL FILM PRINTING
Filed May 26, 1936          3 Sheets-Sheet 2

INVENTOR
ERNEST ROSS
BY
ATTORNEY

July 30, 1940.  E. ROSS  2,209,582
OPTICAL FILM PRINTING
Filed May 26, 1936  3 Sheets-Sheet 3
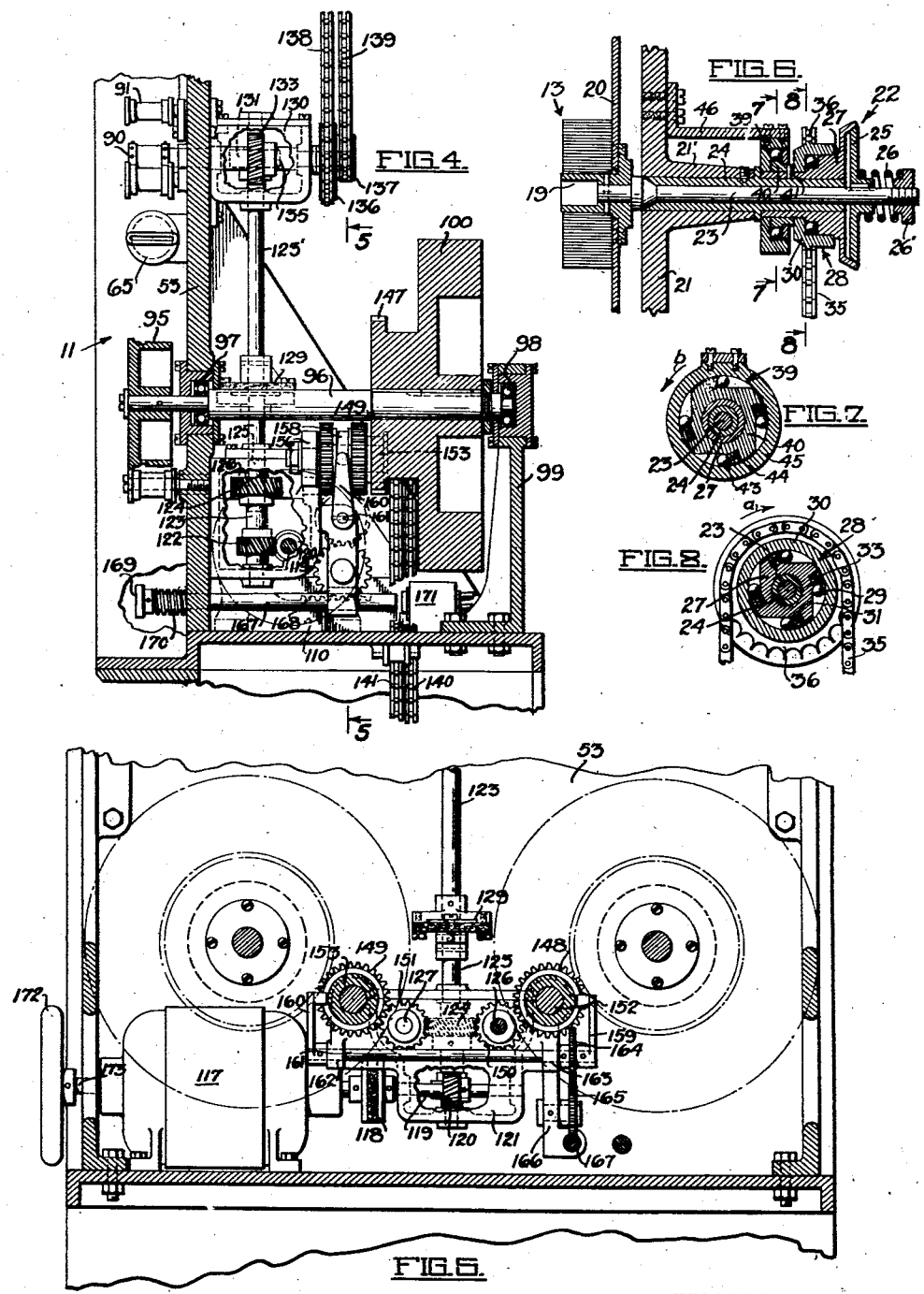
INVENTOR
ERNEST ROSS
BY
ATTORNEY Patented July 30, 1940

2,209,582

UNITED STATES PATENT OFFICE 2,209,582

OPTICAL FILM PRINTING

Ernest Ross, Los Angeles, Calif., assignor, by mesne assignments, to Radio Corporation of America, New York, N. Y., a corporation of Delaware Application May 26, 1936, Serial No. 81,881

6 Claims. (Cl. 88—24)

This invention relates to the art of photographic printing and has particular reference to the printing of motion picture sound film.

As is well known, a negative or positive, from which a print is to be made, is subject to shrinkage to a more or less degree and does not, therefore, correspond in length between sprocket perforations to the raw sensitized film stock which is to be printed. Since this degree of shrinkage, at times, becomes on the order of two per cent or more, it is an important factor in the construction of motion picture film printing apparatus.

Heretofore, the method usually resorted to in printing films of the same size wherein the printing film has shrunk, has been to feed the printing and sensitized films, in superposition, over a film feeding sprocket member while performing the printing operation at a point adjacent the sprocket. The printing or shrunken film is placed next to the sprocket face which has a diameter commensurate with the arc of curvature desired to exactly compensate for the change in length of the printing films due to shrinkage. If the amount of shrinkage is not exactly compensated for, as is usually the case, due to the fact that the arc of curvature is set for an average value, there will result a slippage between the printing and sensitized film. This slippage is due to the difference in sprocket hole pitch between one or both of the two films and the pitch of the sprocket teeth which causes a slight intermittent motion of one of the films. This slippage is especially bothersome when printing sound records of high frequencies wherein the sound wave representations may be distorted or even cancelled out.

One object of the present invention is to print a sensitized film from a shrunken film while compensating for the shrinkage. This is accomplished by providing a separate film pulled inertia controlled member, such as a fly-wheel drum, for each of the films at a point adjacent the printing apertures and driving the films past the apertures by a common sprocket or preferably by two separate synchronously driven sprockets. A resilient film tensioning member is interposed between the sprocket means and the film driven fly-wheel drum to absorb the speed variations due to inaccuracies in the sprocket teeth or to differences in pitch between the sprocket holes in the films and the sprocket teeth on the respective sprockets. Thus it will be seen that although the same number of sprocket teeth perforations on the printing and sensitized films will pass the printing points, i. e. the exposure light beam, per unit of time, the shrunken film will actually run slightly slower, this combination tending to compensate at all times for any and all degrees of shrinkage. The interaction between the film driven fly-wheels and the resilient film tensioning means causes the films to move past the exposure light at a uniform and constant speed.

As an alternative in compensating for the change in length of the printing film due to shrinkage or to aid in assisting the above named mechanism, the ratio between the diameters of the sprocket or sprockets driving the printer film and the sprocket or sprockets driving the sensitized film may be made commensurate with the difference in length of the two films due to shrinkage of one or both thereof. Preferably a series of sprockets or sets of sprockets having different diameters are provided, each set being adapted to be employed for a film having a definite range of shrinkage.

A further object of the invention is to obviate the necessity of rewinding a printing film at the end of each printing operation. This is accomplished by providing film driving sprockets and film reels in the path of each film on either side of the film driven fly-wheels. Each of the film reels is provided with over-running or uni-directional clutches to impart rotation thereof when acting as take-up reels and to produce a frictional drag thereon when acting as supply reels.

A further object of the invention is to prevent slippage or breakage of film engaging a film driven inertia controlled member during acceleration or starting of the film.

This is accomplished by operatively connecting the inertia controlled member to the film driving mechanism during acceleration of the film and disconnecting the inertia member when the correct film speed is obtained.

Referring to the accompanying drawings, Fig. 1 is a front elevational view of a printer embodying the present invention.

Fig. 4 is a sectional elevational view taken along the line 4—4 of Fig. 1.

Fig. 5 is a sectional elevational view taken along the line 5—5 of Fig. 4.

Fig. 6 is a sectional view through the take-up mechanism for one of the various film reels and is taken along the line 6—6 of Fig. 1.

Fig. 7 is a transverse sectional view through one of the over-running clutch mechanisms of one of the take-up devices and is taken along the line 7—7 of Fig. 6.

Fig. 8 is a similar transverse sectional view and is taken along the line 8—8 of Fig. 6.

Figure 1:
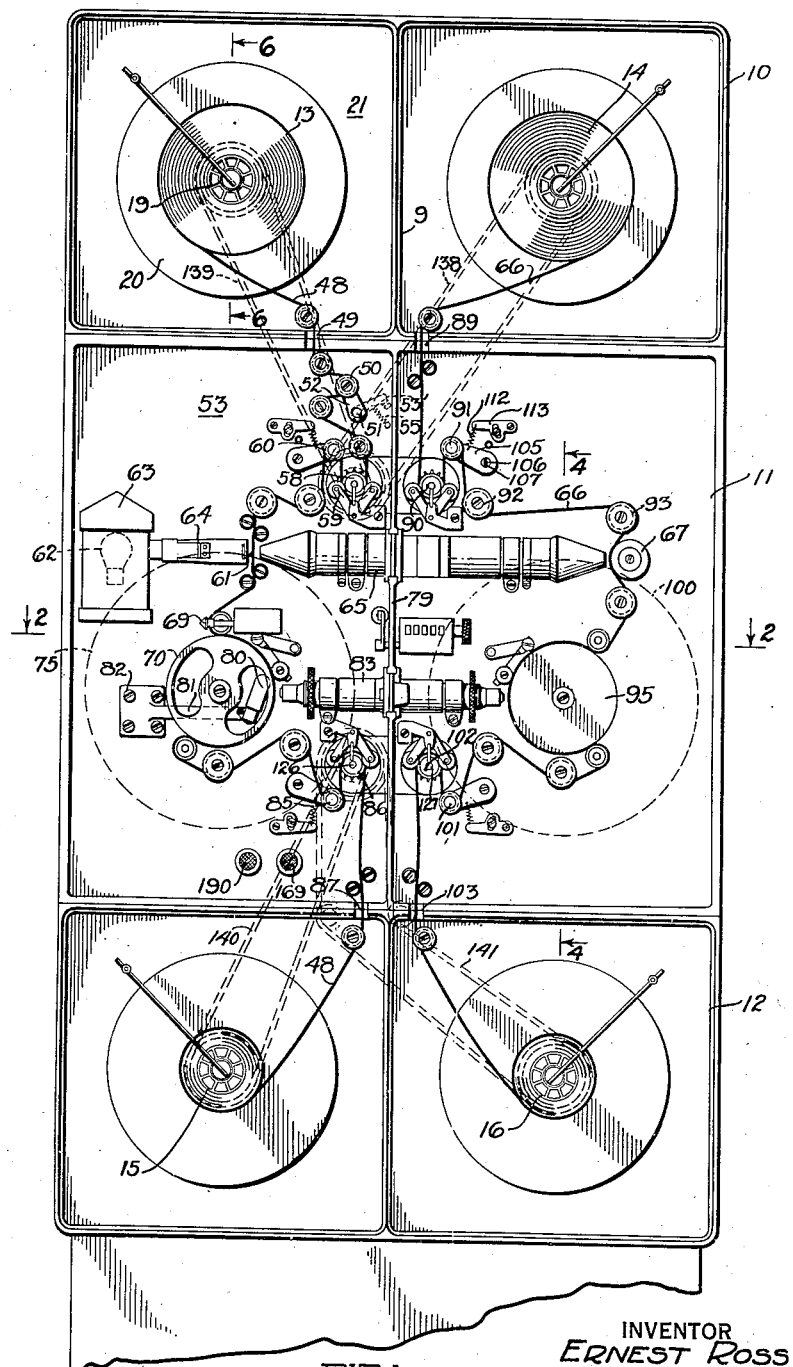

Referring now to Fig. 1, the printer is shown as comprising three main compartments, an upper film magazine compartment 10, a film printing compartment 11 and a lower film magazine compartment 12. Each of these three compartments may be provided with covers or doors to permit operation of the printer without necessitating the placing of the same within a dark room.

The upper film compartment 10 is shown as being divided into two separate compartments by means of a wall 9 to house a negative or printing film reel 13 and a positive or sensitized film reel 14. The lower film compartment 12 is shown as being similarly divided to house a negative reel 15 and a positive reel 16. Due to the fact that the printing apparatus is reversible in direction the reels 13, 14 and 15, 16 are adapted to alternately become supply or take-up reels, depending upon the direction of the film through the printing compartment 11. Each of the film reels comprises a hub 19 on which the film is wound and a rear circular flange 20.

Referring to Figs. 6 to 8, inclusive, wherein the details of the mechanism of reel 13 is shown, the other mechanism being the same, reel 13 is secured to a take-up mechanism generally indicated at 22. The hub 19 and flange 20 are secured to a shaft 23, which is journaled in a sleeve member 24. Sleeve member 24 is held in an apertured boss 21' formed at the rear of the wall 21 of the compartment 10. A friction member 25 slidably keyed for longitudinal adjusting movement on the outer end of the shaft 23 is resiliently urged by means of a spring 26' which is threadedly secured upon the outer end of shaft 23. The friction member 27 is journaled upon the outer surface of sleeve 24 and has an over-running clutch mechanism generally indicated at 28, provided thereon. This over-running clutch mechanism comprises a series of balls 29 (Fig. 8) which are held between an outer sleeve member 30 and wedge forming grooves 31 on the member 27, so formed that they are adapted to wedge the balls 29 against the inner surface of member 30. Springs 33 resiliently engaging the balls 29 tend to wedge the same against outer sleeve member 30. When the film reel shown in Fig. 6 serves as a take-up reel the assembly is driven by means of a chain 35 which in turn, is driven through a sprocket connected to the driving mechanism as described hereinafter. Chain 35 engages a set of chain sprocket teeth 36, formed on the sleeve member 30. When the chain 35 is driven in the direction of the arrow a, (Fig. 8), corresponding to the direction of rotation when reel 13 is employed as a take-up reel, the balls 29 tend to wedge between the grooves 31 and the inner surface of member 30, thus driving this friction member 27 and, in turn, by means of the friction between member 27 and member 25 drive the film reel 13. The friction adjusting nut 26' is so adjusted that a certain amount of slippage will occur between the members 25 and 27 to allow for compensation of the change in speed of the shaft 23 due to an increasing diameter of the film roll upon the hub 19. A second over-running clutch mechanism 39 is also attached to the member 27 and comprises a wedge forming member 40 which is suitably secured to an extending sleeve portion formed on the member 27 by means of a pin 41. Balls 43, springs 44 and an outer sleeve member 45 perform the same function as the balls 29, springs 33 and sleeve member 30 of Fig. 8. The sleeve member 45 is secured by means of a bracket 46 to the wall 21. When the reel in Fig. 6 acts as a supply reel, thus rotating in the direction of arrow b, (Fig. 7), the balls 43 become effective to prevent rotation of the friction member 27, thus the friction between members 25 and 27 prevents over-running of the film reel.

Assuming the reels 13 and 14 to act as supply reels, the negative film 48 after passing from supply reel 13 is carried through a slot 49 in the upper wall portion of the compartment 11 and is guided by means of idler rollers over a buckle alarm switch roller 50. Roller 50 is secured to an arm 52, pivotally supported at 51 upon the rear wall 53 of the compartment 11. Operatively connected to the arm 52 is a circuit closing switch shown by the dotted lines 53'. The arm 52 with its roller 50 is urged in a clock-wise direction by means of a spring 55 so that in case of film breakage or buckling, the switch 53 is closed so as to operate a suitable relay circuit and thus automatically stop the operation of the printer. From the safety roller 50, the film is led over suitable idler rollers to drive sprocket 58 which, in the case of the film moving downwardly through the compartment 11, forms a pull-down sprocket. A pad roller assembly 59 keeps the film in contact with the sprocket during its passage thereover. From sprocket 58 the film passes over an automatic tensioning and damping roller 60 and thence over a number of idler rollers to an edge printing film gate indicated at 61. Here the edges of the film outside of the sprocket tooth perforations are illuminated by means of a printing lamp 62 which is provided in a light-proof housing 63. A light tube 64, preferably containing a condenser lens (not shown), is provided to transmit light from the lamp 62 to the film at 61. A suitable mask is provided so as to allow only the outside edges of the film 48, containing footage numbers, frame lines, film identification indicia, etc., to be illuminated. An optical system provided in the lens tube 65 images the illuminated edge portions of film 48 upon the corresponding edge portions of a positive or sensitized film 66 as it passes over an idler roller 67. From the gate 61 the negative film 48 passes on to a suitable printer lamp intensity changing device generally indicated at 69. This device 69 may be of the usual construction wherein slots or grooves provided on one edge of the negative film are employed to actuate a suitable switch mechanism which, in turn, controls the current in the sound track printing lamp.

The film after passing the device 69 engages a considerable portion of film driven drum 70 from which the sound track portion of the film 48 is printed onto the sound track portion of the positive sensitized film 66.

Figure 2:
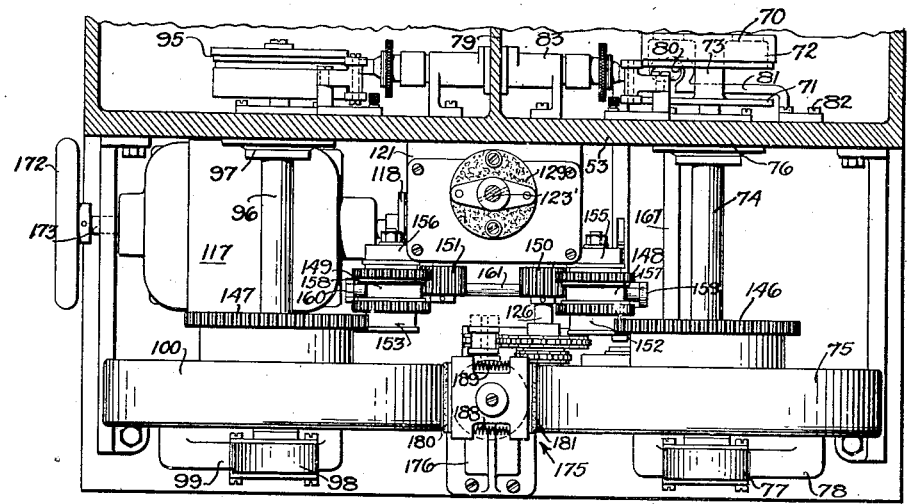
Fig. 2 is a sectional plan view taken along the line 2—2 of Fig. 1.

Referring to Fig. 2, the drum 70 comprises a rear flange 71, adapted to engage an edge portion of the film 48, and a front cup-shaped flange 72 which is adapted to engage the opposite edge portion of film 48. Both of flanges 71 and 72 are secured upon a common hub 73 which is securely fastened to a suitable shaft 74 having a fly-wheel 75 at its outer end. Shaft 74 is journaled within a bearing 76 provided in the wall 53 of compartment 11 and within a second bearing 77 provided on a bracket 78.

A printing lamp 80 is secured upon a bracket 81 which is supported on the wall 53 by means of screws 82 and extends between the two flanges 71 and 72 of drum 70. An optical system provided in a lens tube 83 is focused on the sound track on film 48 which is illuminated by the lamp 80 and images the sound record thereon upon the film 66. A wall 79 separates the compartment 11 into two separate compartments to prevent the sensitized positive film 66 from being fogged by leak-light from the lamps 62 and 80.

Due to the fact that the two films 48 and 66 run in the same direction through the printing compartment 11, the optical systems within the lens tubes 65 and 83 are re-inverting so that the images from the film 48 are focused on the film 66 in an upright manner.

From the drum 70 the negative film 48 passes over a number of idler rollers and under an automatic tensioning and damping roller 85, similar to 60, and thence over a drive sprocket 86 similar to that of 58. From sprocket 86 the film is led between a pair of idler rollers, through a slot 87 in the lower wall portion of compartment 11, and thence onto the reel 15 which serves in this instance as a take-up reel.

The positive or sensitive film 66 follows a path somewhat similar to that of the negative film 48. After passing from the film reel 14 it is led through a slot 89 in the upper wall section of compartment 11, under a sprocket 90, similar to that of 58 but rotating in an opposite direction, and thence over an automatic tensioning roller 91 similar to that of 60. The film then passes around idler rollers 92 and 93, thence over roller 67, lying directly opposite the lens tube 65, and is finally guided by idler rollers onto a film driven drum 95.

As illustrated in Fig. 4, the drum 95 is formed in a single piece and is secured to a shaft 96 which is journaled at one end within a bearing 97, provided in the wall 53, and at its other end within a bearing 98 secured in a bracket 99. A fly-wheel 100 similar to that of 75 is secured to the shaft 96.

From the drum 95 the film 66 is led over a series of idler rollers and thence over another automatic tensioning roller 101 similar to that of 60. Film 66 then passes over a drive sprocket 102, similar to and rotating in the same direction as the upper sprocket 90, and finally passes through a slot 103, being guided by suitable idler rollers. The film is then wound on the film reel 16.

Figure 3:
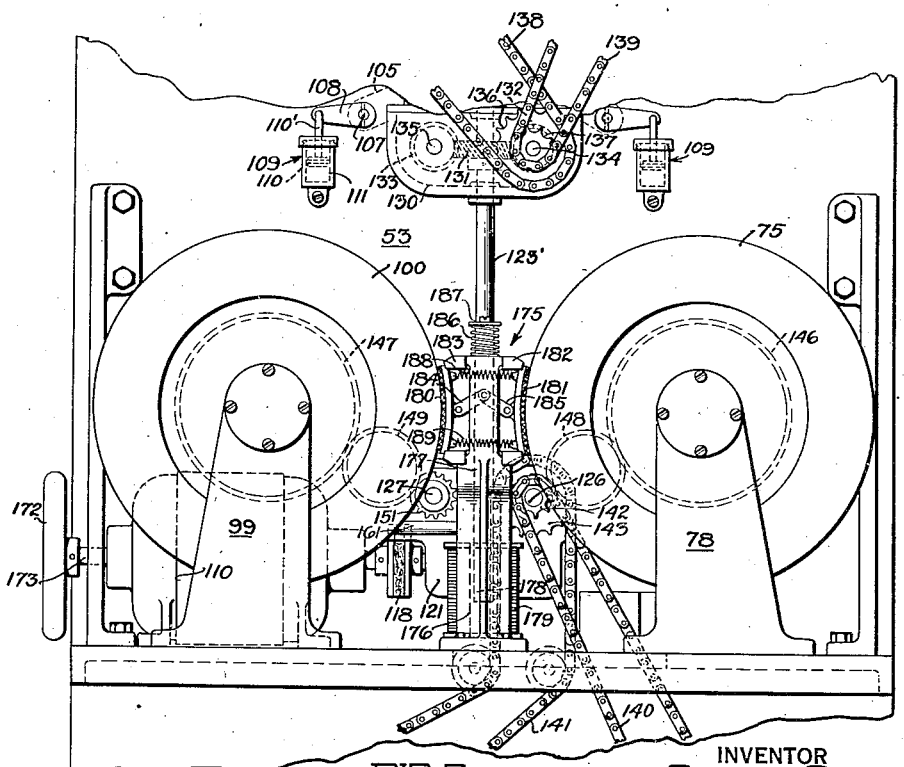
Fig. 3 is a rear elevational view of the printer with the upper and lower portions thereof broken away.

Each of the automatic tensioning and damping rollers 60, 85, 91 and 101 are rotatably carried on one end of an arm 105. Arm 105 is pivotally supported at 106 to the wall 53 and has a pin 107 extending therethrough (Fig. 3) which has secured thereto a second arm 108. Arm 108 operates a suitable dash-pot mechanism generally indicated at 109 which in this case comprises a plunger 110 movable within a cylinder 111 and interconnected with arm 108 by means of a rod 110'. This dash-pot arrangement 109 prevents a free and continuous oscillation of the arm 105. Referring again to Fig. 1, each of the arms 105, is secured to one end of a spring 112. Spring 112 is secured at its other end to an adjustable member 113 whereby the tension within this spring may be varied.

Although means are shown for printing only the sound track and the edge portions, it is to be understood that the picture portions may also be printed preferably by means of an optical system such as that provided in lens tube 65 or by a contact printing arrangement within the printer.

Referring now to Figs. 2 to 5, inclusive, the printer mechanism is driven by means of a single motor 117 situated at the rear of the printer. Motor 117 is connected by means of a flexible coupling 118 and shaft 119 to a spiral gear 120 within a lower gear box 121. Gear 120 meshes with a second spiral gear 122 provided on the lower end of a vertical extending shaft 123. A second spiral gear 124 provided on the shaft 123 engages a spiral gear 125 at either side thereof. One of these gears 125 is provided on each of a pair of sprocket shafts 126 and 127, journaled in the gear box 121, and having the lower film sprockets 86 and 102, respectively, (Fig. 1) secured to the forward ends thereof. These sprockets 86 and 102 are thus rotated in opposite directions but at equal speeds in relation to each other. Shaft 123 is connected by means of a flexible coupling 129 to a vertically extending shaft 123' having its upper end journaled within a gear box 130. A spiral gear 131 secured at the upper end of shaft 123', within the gear box 130, meshes with a pair of spiral gears 132 and 133 on either side thereof. Gears 132 and 133 are secured to sprocket shafts 134 and 135, respectively, which are journaled in the gear box 130. Shafts 134 and 135 have secured at their forward ends the film sprockets 58 and 90, respectively. The sprocket shaft 134 has a pair of chain sprockets 136 and 137 secured thereto at its rear end (Figs. 3 and 4) which are adapted to drive a set of chains 138 and 139, respectively. Chains 138 and 139 drive the sprocket teeth 36 formed on the take-up mechanisms of the reels 14 and 13, respectively. The second set of chain sprockets 142 and 143 are secured upon the lower sprocket shaft 126 and drive a set of chains 140 and 141, respectively. Chains 140 and 141 are adapted to drive the sprocket teeth provided on the take-up mechanisms of the lower reels 15 and 16, respectively.

I will now describe the means for setting the film drums 70 and 95 and their respective fly-wheels 75 and 100 into motion at the beginning of the printing operation. Fly-wheels 75 and 100 are provided with gear teeth 146 and 147. The gear teeth 146 and 147 are adapted to mesh with idler gears 148 and 149 which in turn are driven by gears 150 and 151, respectively, secured to the ends the sprocket shafts 126 and 127, respectively. The gears 148 and 149 are journaled upon stud members 152 and 153, respectively. These stud members are secured to boxes 155 and 156 extending from the body portion of the lower gear box 121. Gears 148 and 149 are adapted to slide in or out of mesh with the sets of gear teeth 146 and 147 on the fly-wheels 75 and 100 respectively, while continuously meshing with the gears 150 and 151, respectively. Grooves 157 and 158 cut in the gears 148 and 149 (Figs. 2 and 4) are engaged by the upper ends of a pair of levers 159 and 160 (Fig. 5) respectively. Lower ends of levers 159 and 160 are secured upon a single transverse shaft 161, which is journaled in bearings 162 and 163 extending from the gear box 121. A gear 164 (Figs. 4 and 5) is also secured to the cross shaft 161 and is engaged by a similar gear 165 journaled within a bracket 166 extending downwardly from the side of gear box 121. A rod 167 slidable longitudinally within bearings formed in the wall 53 and in the lower portion of the bracket 166, has a set of rack teeth 168 which mesh with the gear 165. By pressing a button 169 formed on the outer end of shaft 167, rotation of gears 165 and 164 is effected which in turn causes the idler gears 148 and 149 to mesh with the gear teeth 146 and 147 on fly-wheels 75 and 100, respectively. A spring 170 interposed between the button 169 and the wall 53 urges the rod 67 outwardly and consequently causes the two gears 148 and 149 to move out of mesh with the fly-wheel teeth when pressure is released on the button 169. A switch 171 is provided adjacent the end of the rod 167 which switch is placed in the circuit of the motor 117. In the operation of the starting button 169, the rod 167, through gears 164 and 165, first causes the gears 148 and 149 to mesh with the fly-wheel teeth and then, on further movement of the button 169, causes the switch 171 to close the motor circuit and thus start the motor 117.

A hand-wheel 172 is secured to the motor shaft 173 of motor 117 to allow manual rotation of the printer mechanism for threading of the film and also to align the teeth of gears 148 and 149 with the fly-wheel teeth 146 and 147, respectively, to permit meshing. A suitable relay (not shown) is provided in conjunction with the switch 171 to permit the motor circuit to remain closed after the starting button 169 has been retracted through the action of spring 170.

A braking mechanism generally indicated at 175 (Figs. 2 and 3) is provided to stop the rotation of the film driven fly-wheels 75 and 100 and their accompanying film drums 70 and 95, respectively, when the motor circuit is opened. A bracket 176 situated between the two fly-wheels 75 and 100 forms a sliding bearing for a vertically reciprocal rod 177, the lower end 178 of which forms a plunger which is adapted to be acted upon by a solenoid 179. A pair of brake shoes 180 and 181 are supported at the upper end of the bracket 176 and are adapted to slide horizontally within sets of ways 182 and 183 formed thereon. A pair of links 184 and 185 forming a toggle joint connect the brake shoes 180 and 181 to the vertical bar 177. When the bar 177 is drawn downwardly through the action of solenoid 179, the links 184 and 185 cause the brake shoes 180 and 181 to spread outwardly and thus frictionally engage and stop the fly-wheels 75 and 100. A spring 186 placed between the upper end of bracket 176 and a disc 187 secured to the upper end of the bar 177, raises the bar 177 upwardly and thus retracts the brake shoes 180 and 181 away from the fly-wheels 75 and 100 when no current is passing through the brake solenoid 179. Pairs of balancing springs 188 and 189 secured between the brake shoes 180 and 181 hold the shoes in correct alignment. A "stop" button 190 (Fig. 1) is provided to actuate a suitable switch (not shown) which in turn opens the motor circuit and simultaneously closes the solenoid so as to apply a braking force to the fly-wheels and their respective film driven drums. When the button 190 is allowed to be retracted the solenoid circuit is also opened.

A suitable reversing switch (not shown) is provided in the motor circuit to reverse the direction of rotation of motor 117 and consequently the rotation of the printer mechanism so as to selectively drive the films upward or downward through the printer.

Having thus described the invention, what is claimed as new and desired to secure by Letters Patent, is:

1. A film printer comprising a plurality of vertically arranged compartments, a plurality of supply reels in the upper compartment, a plurality of takeup reels in the lower compartment, a plurality of film-pulled drums in an intermediate compartment, one of said drums being hollow, a light source within said hollow drum, an optical system for projecting light from said hollow drum to said other drum, and means for advancing a plurality of films from the upper compartment to the lower compartment over said drums, said advancing means being also adapted to advance said films from said lower compartment to said upper compartment.

2. A film printer comprising a vertical panel divided into a plurality of vertical sections divided into horizontally disposed compartments, means for supplying and taking up films in the upper and lower sections of said panel, means in an intermediate panel for advancing negative and positive films from said upper to said lower sections or from said lower to said upper sections, said negative film being confined to one series of vertical compartments and said positive film to another series of vertical compartments, a plurality of film-pulled drums in said intermediate section, one of said drums being hollow, a light source in said hollow drum, an optical system for projecting light from said hollow drum to said other drum, and film tensioning means disposed on either side of said drums to enable the said films to be operated in either direction with equal efficiency.

3. A film printer adapted to optically print a positive film from a negative film, a vertical panel for said printer having three sections divided into two horizontally arranged compartments, means in an intermediate section for advancing films from the upper to the lower compartments and from the lower compartments to the upper compartments, a hollow film-pulled drum in an intermediate compartment adapted to be rotated by a negative film, a light source within said drum, an optical system for projecting images from said negative film to said positive film, a film-pulled drum for said positive film, a second optical image projection element for projecting other images from said negative film to said positive film, tensioning devices located above and below said optical system, and means for simultaneously driving said films either upwardly or downwardly in synchronism.

4. A film printer comprising a vertical panel, the upper and lower sections of which include supply and takeup reels alternatively, means in an intermediate section for driving said films either upwardly or downwardly in synchronism, film-pulled drums and flywheels positioned in said intermediate section having their axes in substantially the same horizontal plane, a drive shaft for said film advancing means, and means for interconnecting said drive shaft with said flywheels for actuating said flywheels and drums during acceleration thereof, said means being adapted to disconnect said shaft from said flywheels when uniform speed of said flywheels has been attained.

5. A film printer arranged substantially symmetrically about the center of a vertical panel, an upper section of said panel housing supply and takeup reels alternately and a lower section of said panels housing supply and takeup reels alternately, a plurality of sprockets in the same vertical plane adapted to advance said films from top to bottom or from bottom to top synchronously with respect to the number of frames of said films, a vertical drive shaft for operating said sprockets and said takeup reels, film-pulled drums having respective flywheels attached thereto and having their axes located in substantially the same horizontal plane, a motor for actuating said drive shaft, and means for manually interconnecting said drive shaft with said flywheels during acceleration of said printer and for disconnecting said flywheels from said drive shaft after uniform speed has been attained.

6. A film printer comprising a panel, film supply reels for said panel, film takeup reels for said panel, a plurality of sprockets for advancing a plurality of films from said supply reels to said takeup reels, a pair of film-pulled drums, said sprockets pulling said films over said drums, one of said drums being hollow, a light source in one of said drums, an optical system for projecting light from said hollow drum to the other of said drums, said drums having respective flywheels attached thereto for stabilizing the movement of said films over said drums, a motor for driving said sprockets, and means for directly connecting said motor with said flywheels during acceleration thereof and for disconnecting said flywheels from said motor after said motor has attained uniform speed.

ERNEST ROSS.